US005679927A

United States Patent [19]
Hurkmans et al.

[11] Patent Number: 5,679,927
[45] Date of Patent: Oct. 21, 1997

[54] BURIED SERVICE WIRE CLOSURE

[75] Inventors: Antoon M. Hurkmans, Cumming; Suresh Venkat, Atlanta, both of Ga.; Selim Messelhi, Etobicoke, Canada

[73] Assignee: Communications Technology Corporation, Madison, Ala.

[21] Appl. No.: 385,139

[22] Filed: Feb. 7, 1995

(Under 37 CFR 1.47)

Related U.S. Application Data

[63] Continuation-in-part of Ser. No. 61,927, May 13, 1993, Pat. No. 5,387,763.

[51] Int. Cl.⁶ ............................................. H02G 15/04
[52] U.S. Cl. ............................ 174/92; 174/93; 174/138 F
[58] Field of Search ............................. 174/92, 91, 93, 174/76, 138 F

[56] References Cited

U.S. PATENT DOCUMENTS

| | | | |
|---|---|---|---|
| D. 313,396 | 1/1991 | Messelhi . | |
| 964,969 | 7/1910 | Hesterhagen . | |
| 3,147,338 | 9/1964 | Ekvall et al. | 174/138 F |
| 3,325,591 | 6/1967 | Wahl | 174/138 F |
| 3,394,076 | 7/1968 | Bunn, Jr. et al. | 208/164 |
| 3,519,731 | 7/1970 | Grunbaum | 174/138 F |
| 3,757,031 | 9/1973 | Izraeli | 174/138 F |
| 3,823,254 | 7/1974 | Smith | 174/92 |
| 3,897,128 | 7/1975 | Reavis, Jr. | 339/98 |
| 3,934,076 | 1/1976 | Smith | 174/87 |
| 3,992,569 | 11/1976 | Hankins et al. | 174/92 |
| 4,029,384 | 6/1977 | Reinwall, Jr. | 339/98 |
| 4,029,626 | 6/1977 | Gillemot et al. | 206/31.6 |
| 4,029,896 | 6/1977 | Skinner | 174/138 F |
| 4,035,051 | 7/1977 | Guy | 339/103 R X |
| 4,053,704 | 10/1977 | Smith | 174/87 |
| 4,070,543 | 1/1978 | Thompson et al. | 174/87 |
| 4,084,066 | 4/1978 | Gillemot | 174/92 |
| 4,084,067 | 4/1978 | Gillemot | 174/92 |
| 4,128,739 | 12/1978 | Bernstein | 179/1 PC |
| 4,141,618 | 2/1979 | Reavis, Jr. et al. | 339/97 P |
| 4,176,245 | 11/1979 | Merlack et al. | 174/92 |
| 4,218,724 | 8/1980 | Kaufman | 361/395 |
| 4,253,720 | 3/1981 | Crosier | 339/75 M |
| 4,285,563 | 8/1981 | Crosier et al. | 339/45 M |
| 4,337,374 | 6/1982 | Smith | 174/138 F |
| 4,355,130 | 10/1982 | Heinze | 524/491 |
| 4,375,521 | 3/1983 | Arnold | 523/173 |
| 4,423,916 | 1/1984 | Muehlhausen, II | 339/59 M |
| 4,427,248 | 1/1984 | Smith | 339/14 R |
| 4,435,612 | 3/1984 | Smith | 174/92 |
| 4,610,738 | 9/1986 | Jervis | 156/49 |
| 4,649,230 | 3/1987 | Nielson | 174/65 R |
| 4,751,350 | 6/1988 | Eaton | 174/87 |
| 4,752,653 | 6/1988 | Bachel et al. | 174/93 |
| 4,775,122 | 10/1988 | McClymont | 248/74.4 |
| 4,932,744 | 6/1990 | Messelhi | 350/96.2 |
| 4,933,512 | 6/1990 | Nimiya et al. | 174/92 |
| 4,963,104 | 10/1990 | Dickie | 439/460 X |
| 4,963,700 | 10/1990 | Olsen et al. | 174/138 F |
| 5,001,300 | 3/1991 | Messelhi | 174/87 |
| 5,099,088 | 3/1992 | Usami et al. | 174/76 |
| 5,240,432 | 8/1993 | Daoud | 439/417 |
| 5,355,109 | 10/1994 | Yamazaki | 336/92 X |
| 5,371,323 | 12/1994 | Schneider et al. | 174/92 |
| 5,382,756 | 1/1995 | Dagan | 174/92 |
| 5,487,682 | 1/1996 | Miller et al. | 439/607 X |

FOREIGN PATENT DOCUMENTS

| | | |
|---|---|---|
| 1157137 | 11/1983 | Canada . |
| 2201306 | 8/1988 | United Kingdom . |

*Primary Examiner*—Kristine L. Kincaid
*Assistant Examiner*—Chau N. Nguyen
*Attorney, Agent, or Firm*—Crutsinger & Booth

[57] ABSTRACT

An environmentally sealed enclosure for encapsulating a splice between cable segments. Cable gripping apparatus in the housing limits movement of the cable relative to the housing and includes a bonding portion to prevent separation of sealant from a cable when a cable is positioned to extend through the entrance into the housing. Walls of top and bottom shell segments are configured to be locked together for forming an enclosure containing encapsulant for protecting the splice.

22 Claims, 8 Drawing Sheets

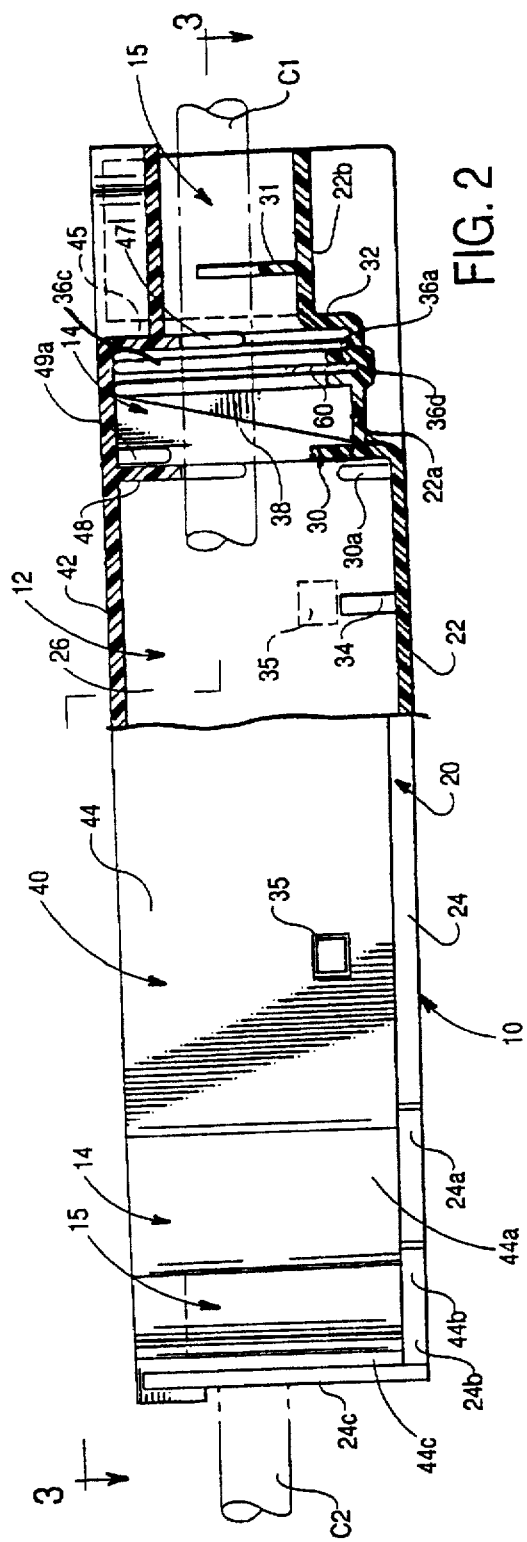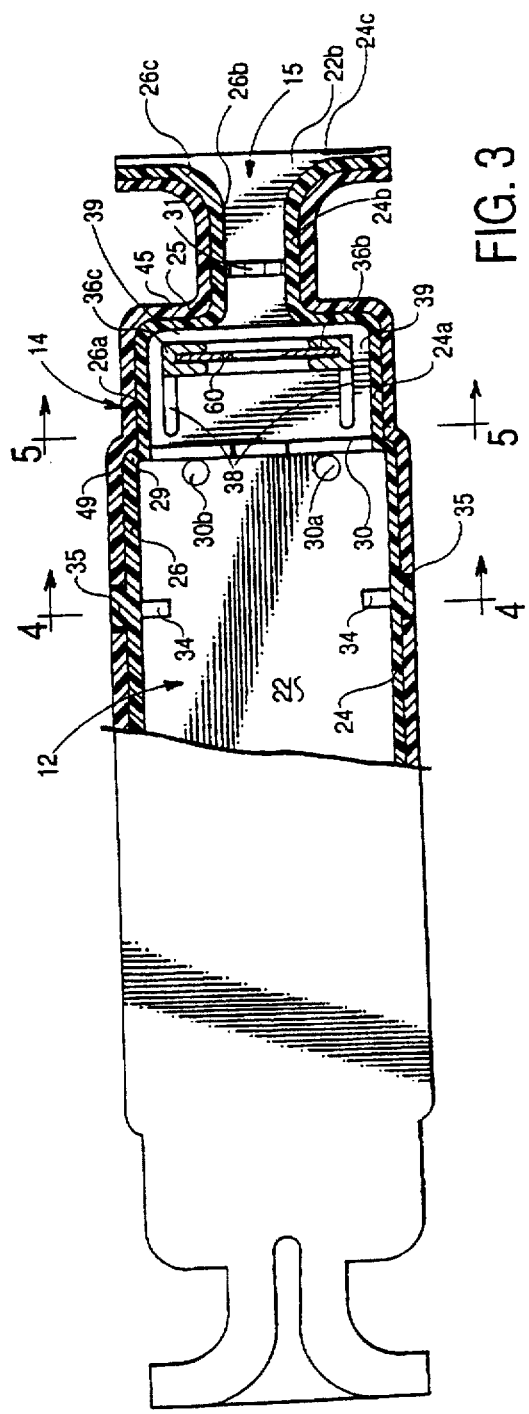

BURIED SERVICE WIRE CLOSURE

CROSS REFERENCE TO RELATED APPLICATION

This application is a Continuation-in-Part of application Ser. No. 08/061,927, filed May 13, 1993 entitled "ENCLOSURE FOR STRAIGHT CABLE SPLICE," now U.S. Pat. No. 5,387,763.

TECHNICAL FIELD

The invention relates to the combination of a strain relief clip and a bonding clip for use in an enclosure for encapsulation of buried telecommunication service wire splices.

BACKGROUND OF INVENTION

Telecommunication cables are interconnected by joining or splicing individual conductors of two or more cables or service wires for forming a telecommunications network. A pre-filled, two-piece closure for from two to twenty-five pair butt spliced cable or cable and dropwire configurations are commercially available from Communications Technology Corporation of Dallas, Texas under its registered trademark "KLIK-IT". These closures are designed for the encapsulation and direct burial of butt spliced cable. Such closures are well known to persons skilled in the art and are disclosed in U.S. Pat. No. 4,337,374 to Donald J. Smith, entitled "Service Wire Splice Enclosure" and U.S. Pat. No. 5,001,300 to Selim Messelhi, entitled "Encapsulated Cable Splice Closure."

U.S. Pat. No. 4,435,612 to Donald J. Smith, entitled "Cable Splice Housing," discloses a cable splice housing formed of two shells for handling two or more cables in end-to-end or side-by-side arrangements. One of the shells has an opening for pouring a sealing material into the central section after the shells are brought together, and a cover for closing the opening. The shells have interengaging wedge-shaped bosses and corresponding openings for locking the shells together.

A housing for an electrical cable splice for handling two or more cables in end-to-end or side-by-side arrangements is commercially available from Communications Technology Corporation of Dallas, Tex. under its registered trademark "PEE WEE" for permanent encapsulation of buried splices. The closure is distributed as a kit containing inner and outer clear plastic sleeves; two end caps with snip-off wire access fingers; a finger-tension bonding connector; and a package containing encapsulation compound which is poured into the closure after a dropwire splice has been made. The closures are commercially available in two sizes, one for service wire up to ¼" outside diameter and another for service wire up to ⅜" outside diameter.

Other enclosures for wire splices are disclosed in U.S. Pat. No. 3,934,076; U.S. Pat. No. 4,053,704; U.S. Pat. No. 4,084,066; U.S. Pat. No. 4,084,067; U.S. Pat. No. 4,337,374; U.S. Pat. No. 4,176,245; U.S. Pat. No. 3,147,338; U.S. Pat. No. 3,325,591; and U.S. Pat. No. 4,029,896.

SUMMARY OF INVENTION

The enclosure for a straight cable splice disclosed herein relates to improvements in devices of the type disclosed in U.S. Pat. No. 4,337,374; U.S. Pat. No. 4,435,612 and U.S. Pat. No. 5,001,300.

The enclosure for a splice between first and second cables having a layer of insulation includes a housing formed of housing segments having an entrance and sealant in the housing segments. Cable gripping apparatus in the housing limits movement of the cable relative to the housing to prevent separation of the sealant from a cable when a cable is positioned to extend through the entrance into the housing. A preferred embodiment of the cable gripping apparatus includes an integrally formed strain relief clip and bonding clip.

The cable gripping apparatus includes a thin, substantially flat, and generally U-shaped member having an elongated opening bounded by edges which engage and grip the layer of insulation on the cable to relieve stress in a splice in said housing when cable segments are in tension.

One of the housing segments forming the enclosure has spaced first and second cable engaging projections that urge the cable into engagement with the gripping apparatus.

BRIEF DESCRIPTION OF THE DRAWINGS

Drawings of a preferred embodiment of the invention are annexed hereto, so that the invention may be better and more fully understood, in which:

FIG. 2 is a side elevational view thereof, parts being broken away to more clearly illustrate details of construction;

FIG. 3 is a cross-sectional view taken substantially along line 3—3 of FIG. 2;

Numeral references are employed to designate like parts throughout the various figures of the drawing.

DESCRIPTION OF A PREFERRED EMBODIMENT

Figure 1:
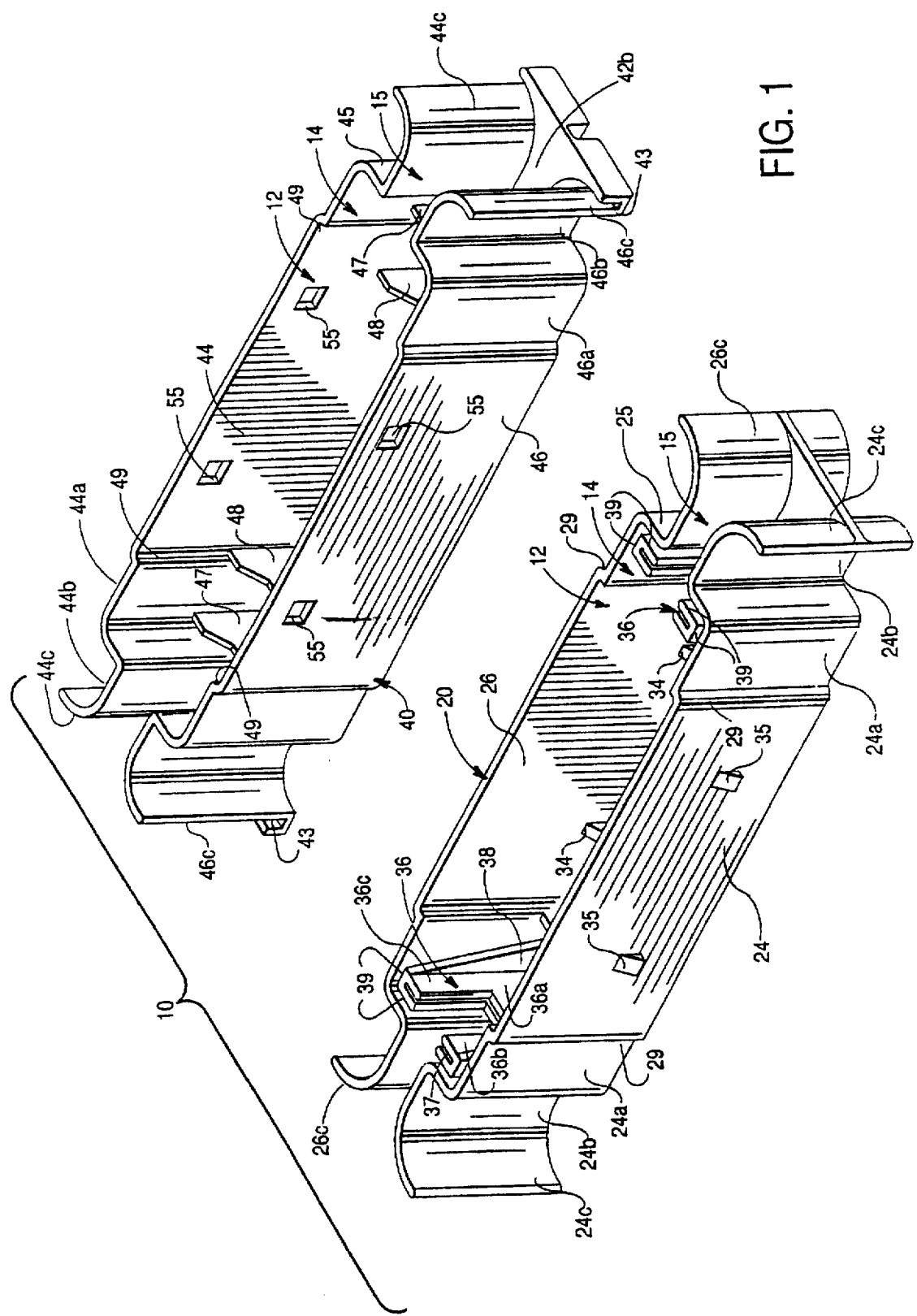
FIG. 1 is an exploded perspective view of an enclosure.
Figure 10:
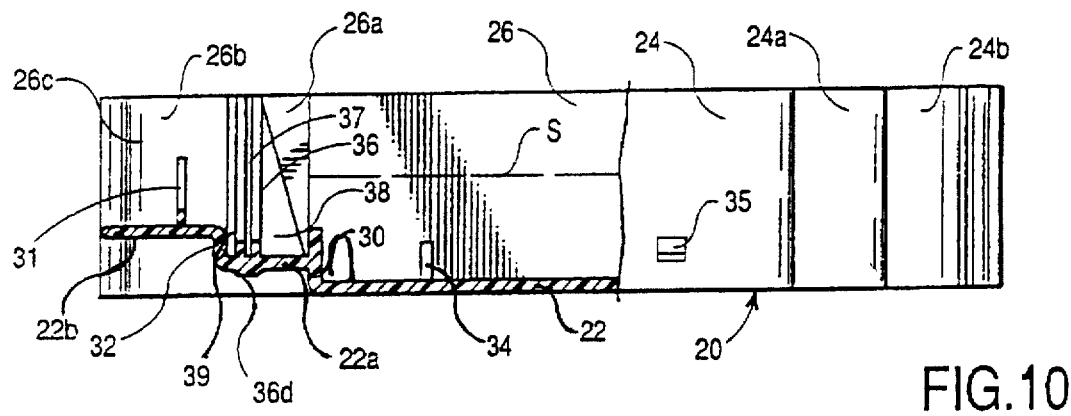
FIG. 10 is a cross-sectional view taken along line 10—10 of FIG. 9.
Figure 13:
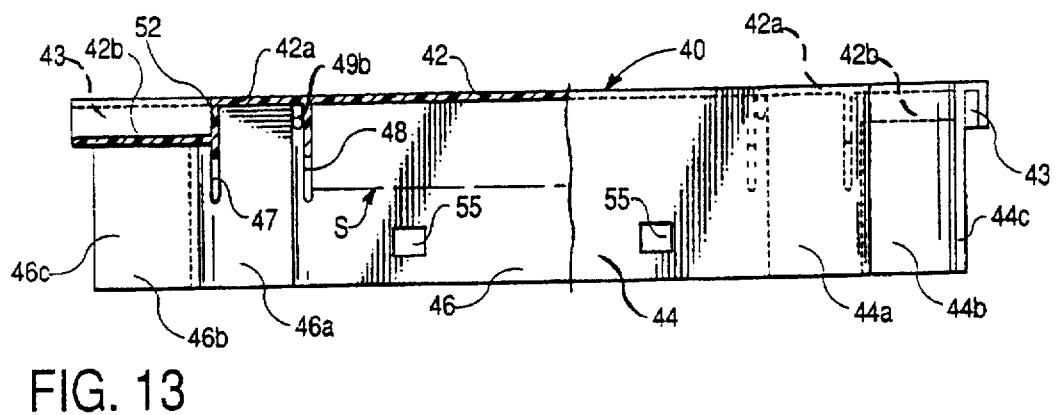
FIG. 13 is a cross-sectional view taken along line 13—13 of FIG. 12.

Referring to FIGS. 1–3, the numeral 10 generally designates a sealant filled, two-part enclosure for a wire splice formed by a female bottom shell segment 20 and a male top shell segment 40, each of the shell segments being configured to form a central housing section 12 between spaced throat sections 14 and spaced entrance sections 15. The central housing section 12 of each shell segment 20 and 40 is partially filled with a suitable gel or sealant S, as illustrated in FIGS. 10 and 13, for encapsulating a splice between conductors in ends of cables C1 and C2 positioned end-to-end, one cable extending through each entrance section 15 of the enclosure 10. Cables C1 and C2 may contain conductors, for example, from four to twelve pairs of telecommunication lines.

The bottom shell segment 20 is configured to grip ends of cables C1 and C2 while the craftsman splices or joins ends of conductors in the cable.

Figure 9:
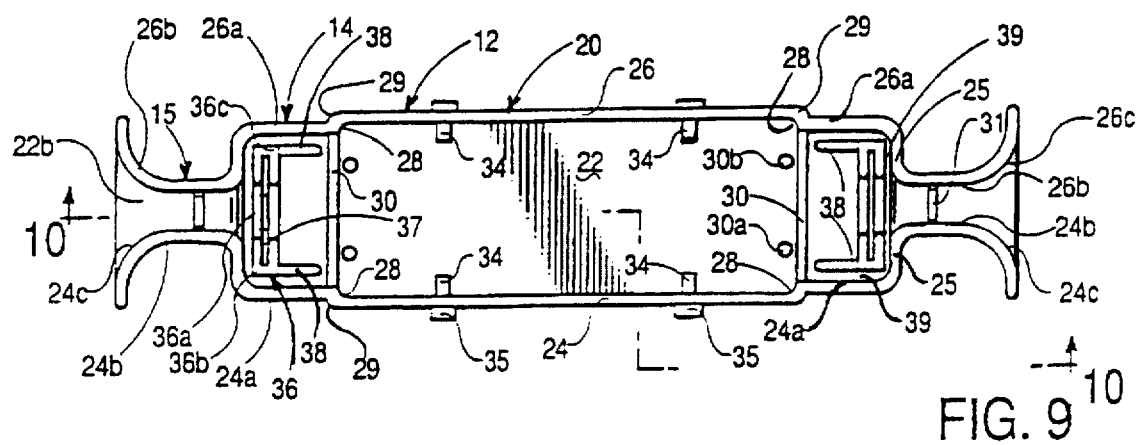
FIG. 9 is a top plan view of the bottom shell segment.
Figure 11:
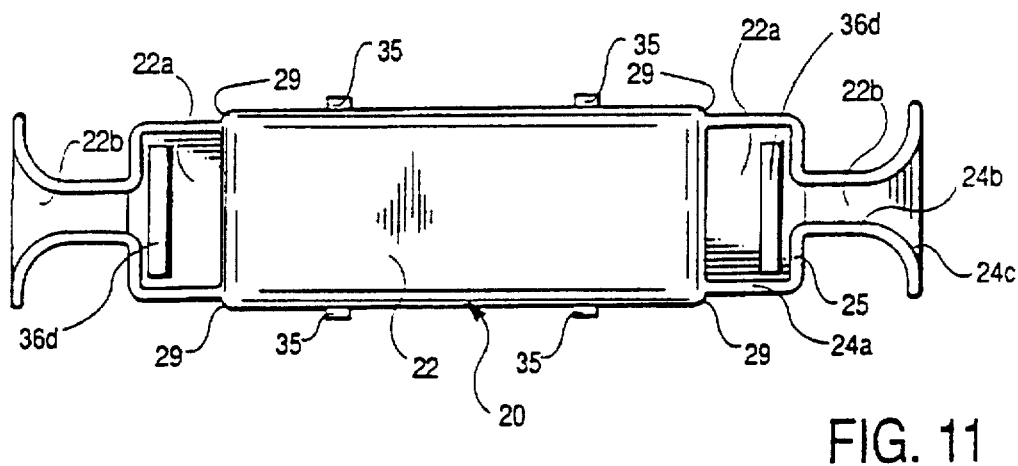
FIG. 11 is a bottom plan view of the bottom shell segment.
Figure 12:
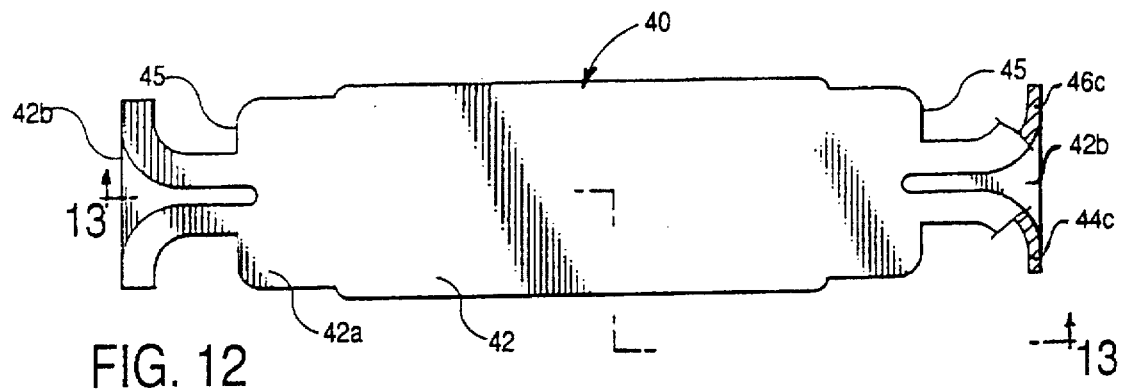
FIG. 12 is a top plan view of the top shell segment.
Figure 14:
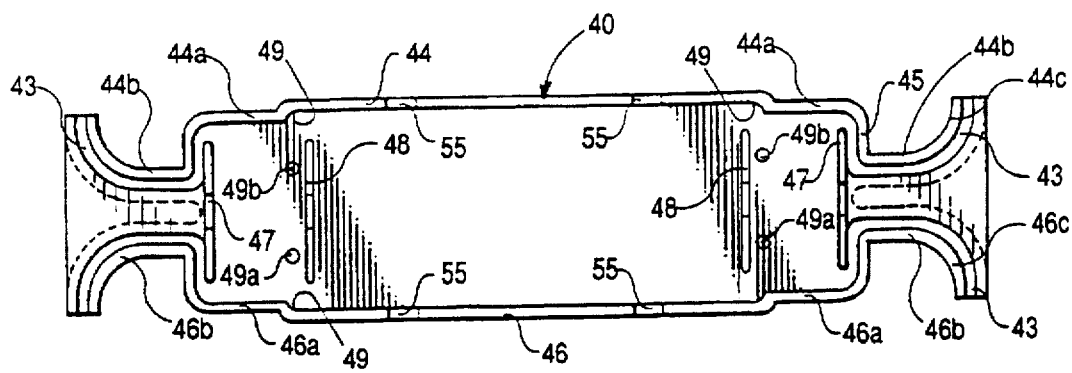
FIG. 14 is a bottom plan view of the bottom shell segment.

Details of construction of the bottom shell segment 20 are illustrated in FIGS. 9, 10 and 11 while details of construction of the top shell segment 40 are illustrated in FIGS. 12, 13 and 14 of the drawing.

Figure 4:
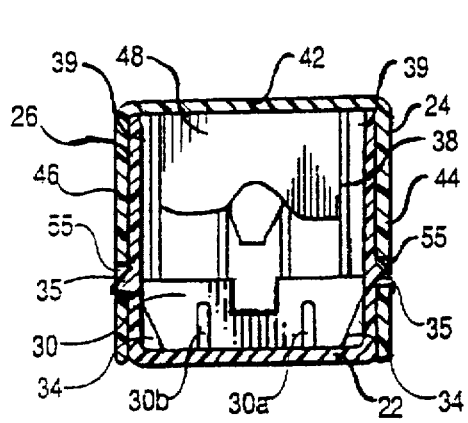
FIG. 4 is a cross-sectional view taken along line 4—4 of FIG. 3.

As best illustrated in FIGS. 9-11 of the drawing, the central housing section 12 of the bottom shell segment 20 is formed by a bottom wall segment 22 extending between upwardly extending front wall segment 24 and rear wall segment 26. The throat section 14 of bottom shell segment 20 is formed by a bottom wall segment 22a bounded on two edges by a front wall segment 24a and a rear wall segment 26a. Each entrance section 15 has a bottom wall segment 22b, front wall segment 24b and rear wall segment 26b. As best illustrated in FIGS. 1, 4 and 9, the front and rear wall segments 24b and 26b have curved outer extremities 24c and 26c that guide a cable into the entrance section 15.

As best illustrated in FIG. 10 of the drawing, the bottom wall segment 22b of entrance section 15 is formed on an elevation above that of the bottom wall segment 22a of throat section 14 which is formed at an elevation above the elevation of bottom wall segment 22 of the central housing section 12.

As illustrated in FIG. 9 of the drawing, front wall segments 24, 24a and 24b are offset laterally as are rear wall segments 26, 26a and 26b such that the cross-sectional area of bottom shell segment 20 is stepped progressively from the central housing section 12 toward opposite ends of enclosure 10. Sockets 28 and shoulders 29 are formed at the intersections of the wall segments 24 and 24a and at the intersection of wall segments 26 and 26a. End wall segments 25 extend inwardly from outer ends of front wall segments 24a and rear wall segments 26a and connect with rear edges of wall segments 24a and 26b.

A short partition wall segment 30, having a passage for receiving a bonding rod 190 extends upwardly from opposite ends of bottom wall segment 22 for supporting bottom wall segment 22a of each throat section 14. Posts 30a and 30b, best illustrated in FIG. 4, extend upwardly from bottom wall segment 22 adjacent partition wall segment 30 for retaining a blocking sheet of material (not shown) to close throat section 14 while sealant is being deposited in the central housing section of bottom shell segment 20. The blocking sheet is removed after the shell segment is partially filled with sealant.

A wall segment 32 extends upwardly from an end of each bottom wall segment 22a for supporting bottom wall segment 22b pin the entrance section 15 at opposite ends of enclosure 10. A generally U-shaped support bracket 31 is secured to bottom wall segment 22b and to front and rear wall segments 24b and 26b in the entrance section 15 for centering a cable C1 or C2 in entrance section 15 and for stabilizing the cable to prevent movement of the cable in the throat section 14 of the housing. Movement of the cable in the throat section 14 could form a gap in the sealant through which moisture would migrate.

As best illustrated in FIGS. 9 and 10, stiffener ribs 34 extend upwardly from bottom wall section 22 in housing section 12 and are secured to lower portions of front wall segment 24 and rear wall segment 26. Locking tabs 35 extend outwardly from outer surfaces of front wall segment 24 and rear wall segment 26 for securing bottom shell segment 20 in top shell segment 40, as will be hereinafter more fully explained.

As best illustrated in FIGS. 1, 2, 3 and 5, each throat section 14 of bottom shell segment 20 is provided with a boss 36 having a lower portion 36a formed in bottom wall segment 22a, a rib 36d on the outside of bottom wall segment 22a, and upwardly extending leg portions 36b and 36c spaced inwardly from front wall segment 24a and rear wall segment 26a. The boss 36 has a groove 37 formed for supporting a strain relief clip 60, as will be hereinafter more fully explained.

Triangular shaped gussets 38 are formed adjacent opposite ends of boss 36 and extend upwardly from bottom wall segment 22a to upper ends of legs 36b and 36c of boss 36. As best illustrated in FIG. 9 of the drawing, gussets 38 are spaced inwardly from front wall segment 24a and rear wall segment 26a leaving space 39 therebetween.

Boss 36 is spaced inwardly from wall 32 leaving space 39 between boss 36 and wall 32. Leg portions 36b and 36c of boss 36 are spaced inwardly from end wall segment 25 leaving space 39 between end wall segment 25 and boss 36.

When a cable C1 is positioned as illustrated in FIG. 2 of the drawing, movement of shell segment 40 downwardly over shell segment 20 urges sealant into sealing relation with outer surfaces of cable C1 in throat section 14 of the housing. Sealant flows through space 39, illustrated in FIG. 5, between gussets 38 and legs 36b and 36c of boss 36 to fill the outer portion of throat section 14 and the inner end of entrance section 15. Thus, sealant is forced into sealing relation with the surface of cable C1 adjacent opposite sides of strain release clip 60 which scores and grippingly engages the outer surface of cable C1.

Details of construction of top shell segment 40 are best illustrated in FIGS. 12-14 of the drawing.

Referring to FIGS. 2, 3 and 12-14, the central housing section 12 of top shell segment 40 has a top wall segment 42 bounded by a front wall segment 44 and a back wall segment 46. Each throat section 14 of top shell segment 40 has a top wall segment 42a, a front wall segment 44a and a rear wall segment 46a. Each entrance section 15 of top shell segment 40 has a top wall segment 42b, a front wall segment 44b and a rear wall segment 46b. As best illustrated in FIG. 14, the front and rear wall segments 44b and 46b have curved outer extremities 44c and 46c that guide a cable into the entrance section 15 and upper edges of wall segments 44b, 44c, 46b and 46c are folded over to form a channel 43 for capturing the upper edges of wall segments 24b, 24c, 26b and 26c on bottom shell segment 20.

As best illustrated in FIG. 13 of the drawing, top wall segments 42 and 42a lie in a common plane while top wall segments 42b in the entrance section 15 of top shell segment 40 is formed at an elevation below that of top wall segments 42 and 42a and is supported by an end wall segment 45 extending downwardly from top wall segments 42a.

A pair of generally V-shaped projections 47 and 48 extend downwardly from top wall segments 42 and 42a, as illustrated in FIGS. 1, 4, 5, 6, 13 and 14, for centering the cable in the enclosure and for engaging the cable adjacent opposite sides of strain relief clip 60 for inserting and securing the cable in the clip 60. The generally V-shaped projections 47 stabilize the cable to prevent movement of the cable in the throat section 14 of the housing. Movement of the cable in the throat section 14 could form a gap in the sealant through which moisture would migrate.

Posts 49a and 49b extend downwardly from top wall segment 42 adjacent projection 48 for retaining a blocking sheet of material (not shown) to close throat section 14 while sealant is being deposited in the central housing section of top shell segment 40. The blocking sheet is removed after the shell segment is partially filled with sealant.

As best illustrated in FIG. 13 of the drawing, recesses 55 are formed in front wall segment 44 and back wall segment 46.

Figure 6:
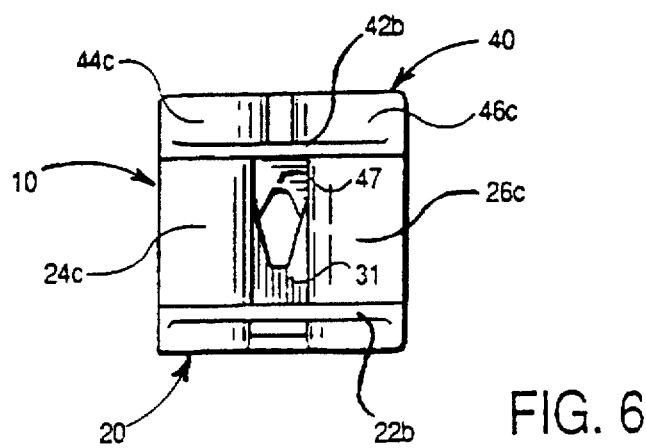
FIG. 6 is an end view of the enclosure.

As best illustrated in FIGS. 2 and 3 of the drawing, when the male bottom shell segment 20 is positioned inside the female top shell segment 40, front and rear walls 24 and 26 of bottom shell segment 20 are positioned adjacent inner surfaces of front wall segment 44 and rear wall segment 46 of top shell segment 40. As illustrated in FIG. 6, front and rear wall sections 24a and 26a of bottom shell segment 20 are positioned between front wall sections 44a and rear wall sections 46b of top shell segment 40. In the entrance section 15 of enclosure 10, front wall segment 24b and rear wall segment 26b of bottom shell segment 20 are positioned between front wall segment 44b and rear wall segment 46b of top shell segment 40, as illustrated in FIG. 3.

Referring to FIG. 1, shoulders 29 on the outer surface of wall segments 44 and 44a extend into sockets 49 in the inner surface at the intersection of wall segments 44 and 44a. Shoulders 29 assist in aligning locking tabs 35 on outer surfaces of front wall segment 24 and rear wall segment 26 of bottom shell segment 20 with openings 55 formed in front wall segment 44 and rear wall segment 46 of top shell segment 40 for locking the shell segments 20 and 40 together.

End wall segments 25, between throat section 14 and entrance section 15 of bottom shell segment 20, extend upwardly between end wall segment 45 and V-shaped projection 47 on top shell segment 40 such that the upper edges of front wall segments 25 are captured between the end wall segments 45 and projections 47 on top shell segment 40.

Figure 7:
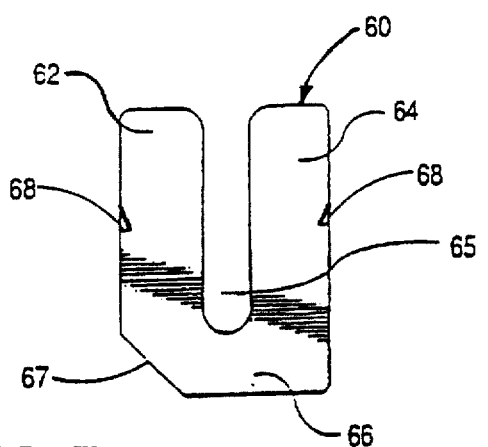
FIG. 7 is a front elevational view of a strain relief clip.
Figure 8:
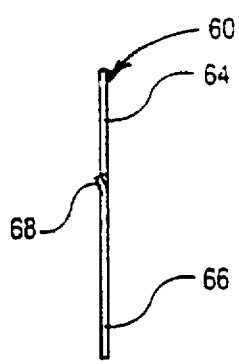
FIG. 8 is a side elevational view of the strain relief clip.

As best illustrated in FIGS. 7 and 8 of the drawing, the strain relief clip 60 is a thin substantially flat generally U-shaped member formed by legs 62 and 64 separated by a slot 65 and joined at lower ends by a connector portion 66. As best illustrated in FIG. 7, one corner of connector portion 66 is removed to provide a tapered surface 67 to facilitate positioning strain relief clip 60 in groove 37, best illustrated in FIG. 1, formed in boss 36 on bottom shell segment 20.

Outwardly deflected barbs 68 are formed adjacent outer edges of each leg 62 and 64 of strain relief clip 60. Deflected barbs 68 are formed by cutting the outer edge of each leg 62 and 64, for example at an angle of 30° relative to the outer edge of each leg 62 and 64 and deflecting a portion of each leg 62 and 64 outwardly from the plane of the body of clip 60 for forming a sharp barb 68 on each leg 62 and 64.

When cable C1 or C2 is positioned in slot 65, edges of legs 62 and 64 score and grip the insulating sheath on the cable. However, slot 65 is sized to prevent cutting through the insulating sheath and the electrical conductors housed therein.

As best illustrated in FIGS. 2 and 3 of the drawing, curved front and rear wall sections 24c and 26c guide cable C1 through entrance section 15 and throat section 14 into the central section 15 of enclosure 10. Support bracket 31 in the entrance section 14 of bottom shell segment 20 centers cable 31 in the housing. Projections 47 and 48 on top shell segment 40 urge cable C1 downwardly through slot 65 in strain relief clip 60 such that edges of legs 62 and 64 of clip 60 indent or score the insulated cover on cable C1 to prevent movement of cable C1 longitudinally of the housing sections. Further, surfaces on projections 47 and 48 as well as surfaces on support bracket 31 urge spaced segments of cable C1 toward the center of the housing sections.

Figure 5:
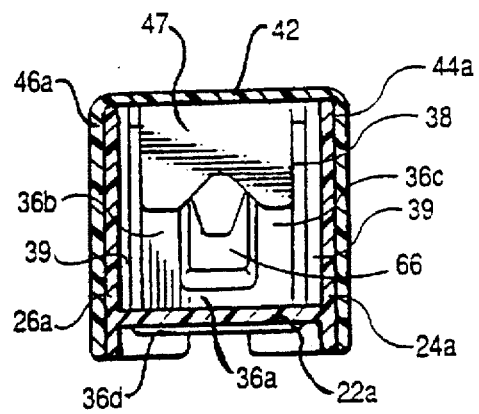
FIG. 5 is a cross-sectional view taken along line 5—5 of FIG. 3.

As the top shell segment 40 is moved downwardly over bottom shell segment 20 toward the position illustrated in FIGS. 2 and 3 of the drawing, sealant in the central section 12 flows to fill throat section 14. Referring to FIGS. 1,3 and 5, sealant in the throat section 14 flows through the curved space 39 between gussets 38 and legs 36b and 36c of boss 36 such that sealant flows toward cable C1 adjacent end wall segment 25 into the entrance section 15 of the housing.

When shell segments 20 and 40 are properly positioned, latching tabs 35 snap into openings 55 for locking the shell segments together preventing movement of one shell segment relative to the other.

Upper edges of walls of the bottom shell segment 20 extend into the top shell segment 40 and space between the wall segments of the shell segments are sealed by sealant forced out of the central section 12 of the housing. Upper edges of front and rear wall segments in the entrance section 15 are captured in the channel 43 at the upper end of front and rear walls of the top shell segment 40. Thus, front and rear wall segments are securely locked together. The stepped cross-sectional area of the housing in the central section 12, throat section 14 and entrance section 15 facilitate attachment of the shell segments together to form a strong rigid construction and facilitate the flow of sealant to block ingress of moisture into the housing. Thus, conductors in cable C1 and C2 can be spliced to form electrical connections which are protected by sealant from the environment. Strain relief clips 60 stabilize cables C1 and C2 to prevent the cables being pulled out of the housing and to prevent damage to spliced conductors in the housing.

A modified form of strain relief clip 60 is generally designated by the numeral 160 in FIGS. 15–22 of the drawing. The primary difference between strain relief clip 60 and strain relief clip 160 is that clip 160 incorporates a bonding clip 180 which is connected through a conductor, such as bonding rod 190 with a bonding clip in the opposite end of enclosure 10 for assuring that the grounding shield or conductor of cable C1 is connected to the ground conductor of cable C2.

Figure 15:
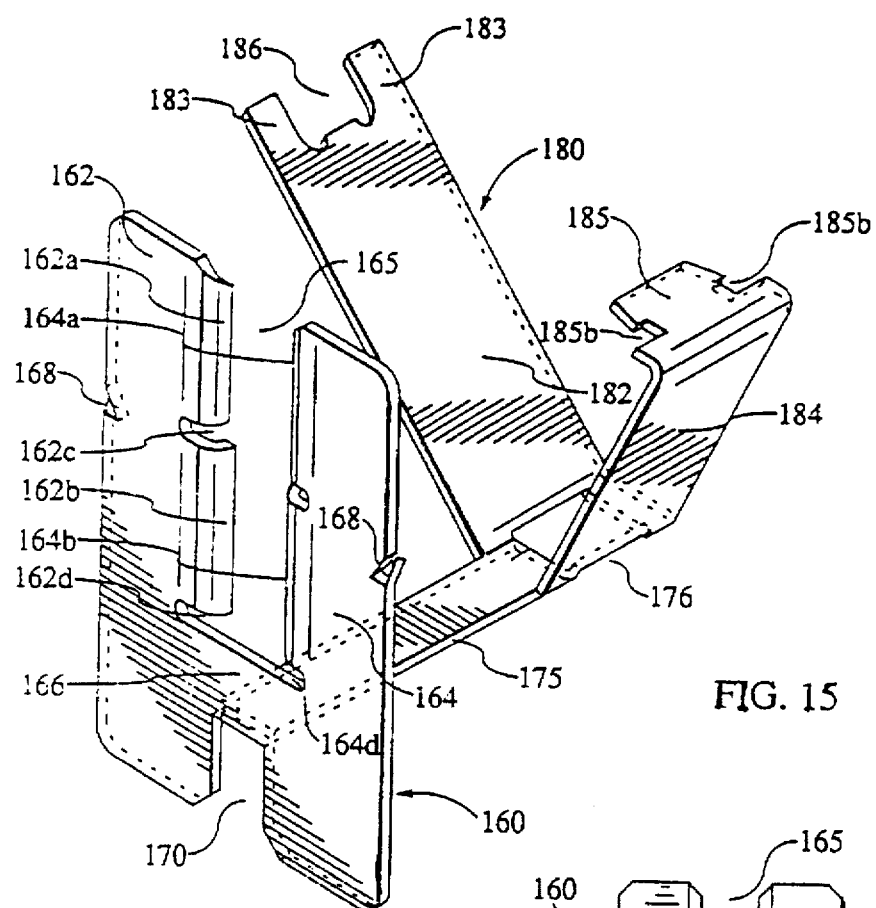
FIG. 15 is a perspective view of a second embodiment of the strain relief clip in combination with a bonding clip.

Referring to FIG. 15 of the drawing, strain relief clip 160 is a thin substantially flat generally H-shaped member formed by legs 162 and 164 and a connector portion 166. A slot 165 is formed between upper portions of legs 162 and 164 and a slot 170 is formed between lower portions of legs 162 and 164. Leg 162 has an upper inwardly deformed or rolled portion 162a and a lower inwardly deformed or rolled portion 162b extending along one side of slot 165. The upper inwardly extending portion 162a and the lower inwardly extending portion 162b are divided by a slot 162c. A horizontally extending slot 162d is formed adjacent the lower edge of inwardly extending portion 162b adjacent the upper surface of connector 166.

Leg 164 is a mirror image of leg 162 and has upper and lower inwardly deformed portions 164a and 164b, separated by slot 164c. Slot 164d is formed between the upper edge of connector portion 166 and the lower edge of inwardly deformed portion 164b.

Inwardly deformed portions 162a and 164a form upper jaws while portions 162b and 164b form lower jaws. The upper and lower jaws, isolated by slots 162c and 164c, act independently. In a housing for a butt-splice, cable C1 is gripped by the lower jaws and cable C2 by the upper jaws. Further, two cables may extend into either end of the enclosure.

Each leg 162 and 164 has a pair of barbs 168 formed adjacent outer edges thereof. The deflected barbs 168 are formed by cutting the outer edge of each leg 162 and 164, for example at an angle of 30° relative to the outer edge of each leg 162 and 164 and deflecting a portion of each leg outwardly from the plane of the body of the strain relief clip 160 for forming the barbs.

A bonding clip 180 is a generally V-shaped member having legs 182 and 184 joined by connector strap portion 175 to strain relief clip 160.

Figure 16:
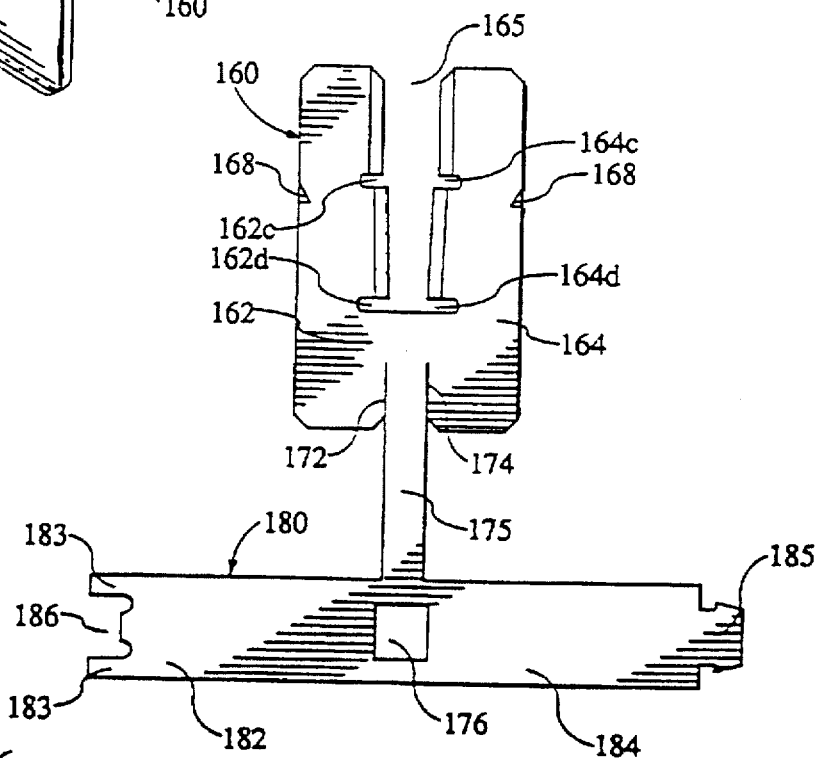
FIG. 16 is an elevation view of a blank for forming the combined strain relief clip and bonding relief clip.
Figure 19:
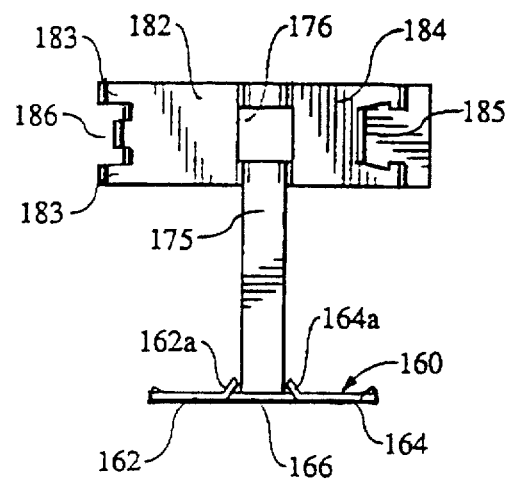
FIG. 19 is a top plan view.
Figure 20:
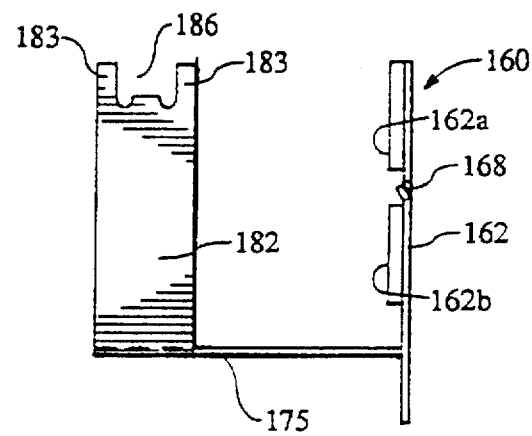
FIG. 20 is a side elevational view.
Figure 17:
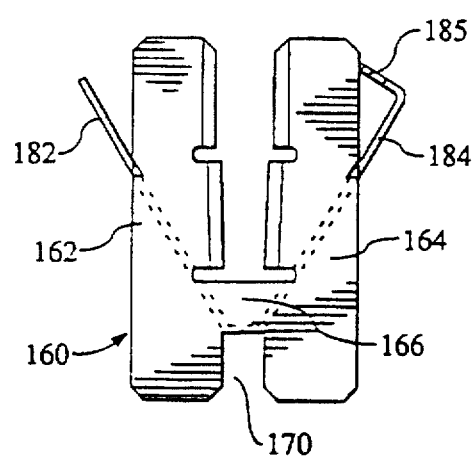
FIG. 17 is a front elevational view thereof.
Figure 18:
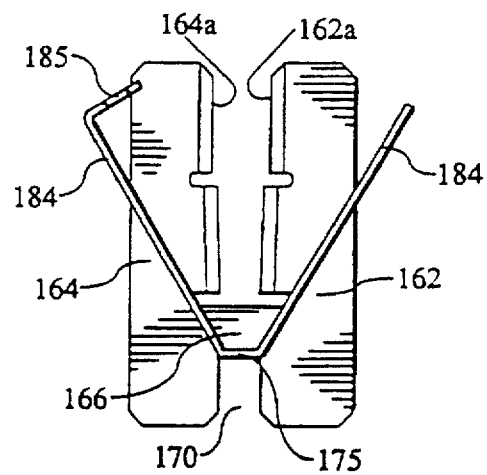
FIG. 18 is a rear elevational view thereof.

As best illustrated in FIG. 16 of the drawing, strain relief clip 160 and bonding clip 180 are of unitary construction and formed from a substantially flat blank or sheet of electrically conductive material.

The strain relief clip 160 and bonding clip 180 are joined by connector strap portion 175. The lower portion of bonding clip 180 is cut as indicated at 172 and 174 for forming a slot 170 in bonding clip 180 when connector strap portion 175 is deflected from the position illustrated in FIG. 16 of the drawing to the position illustrated in FIG. 15. An opening 176 is formed at the juncture between legs 182 and 184 and adjacent the end of connector strap portion 175 to form a weakened portion to facilitate deflecting legs 182 and 184 from the position illustrated in FIG. 16 to the position illustrated in FIG. 15.

A suitable latching mechanism is formed on the upper ends of legs 182 and 184. In the illustrated embodiment, leg 184 has a tang 185 having cutout portions 185a and 185b formed adjacent opposite sides thereof. Leg 182 has spaced tabs 183 formed adjacent opposite sides of a passage 186.

When legs 182 and 184 are moved together, tang 185 extends through passage 186 and tabs 183 are folded over to engage and capture a rear surface of leg 184 to prevent movement of leg 182 relative to leg 184.

Figure 21:
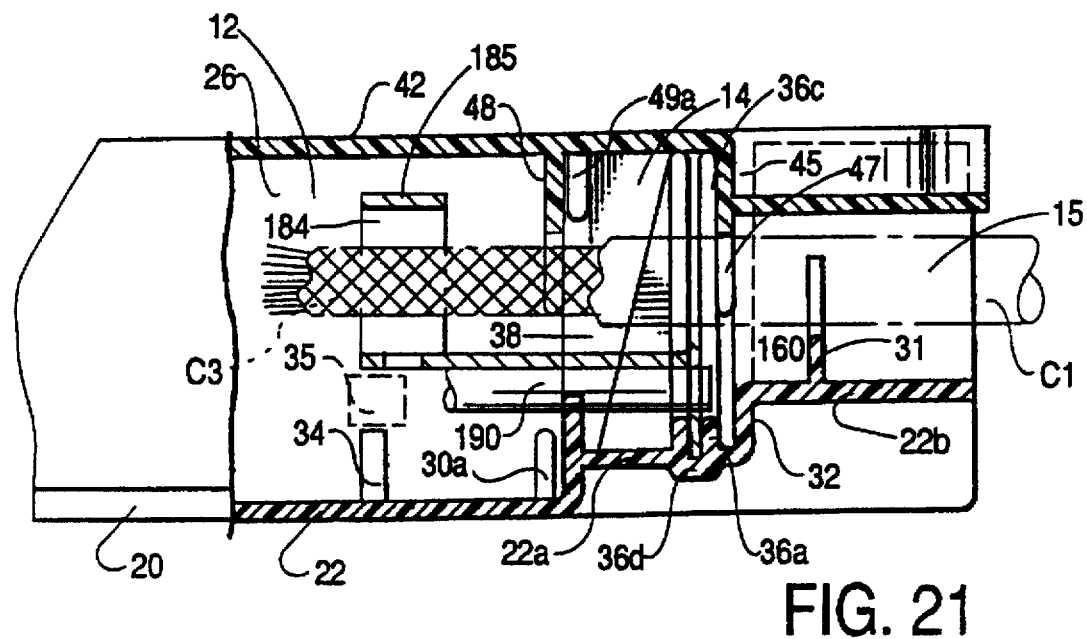
FIG. 21 is a fragmentary cross-sectional view similar to FIG. 2 illustrating the second embodiment.
Figure 22:
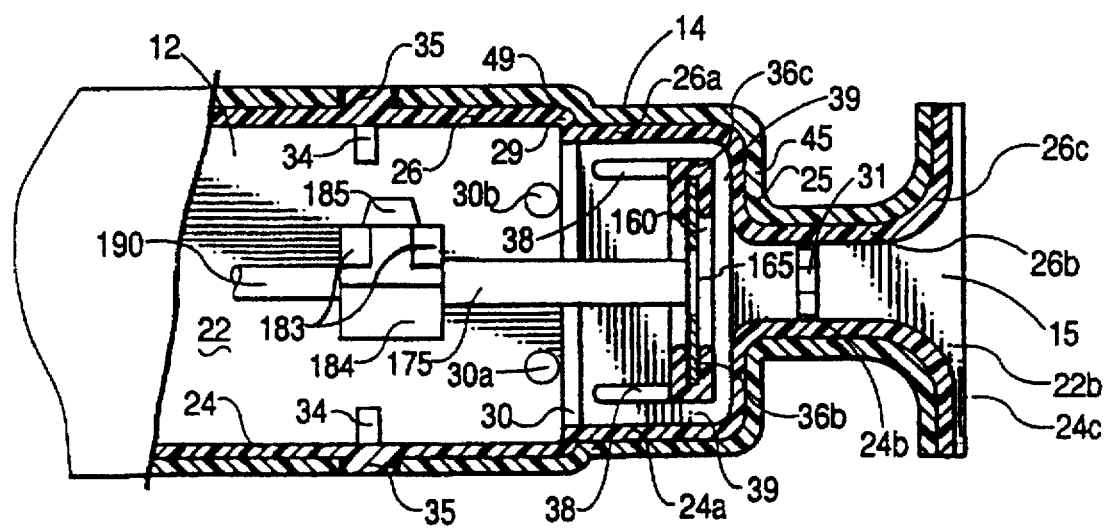
FIG. 22 is a fragmentary cross-sectional view similar to FIG. 3 of the second embodiment.

Referring to FIGS. 21 and 22 it should be appreciated that when strain relief clip 160 is positioned in groove 37 in boss 36, inwardly deflected jaw portions 162a and 164a or 162b and 164b will engage and grip the insulation on the outer surface of cable C1 or cable C2. Legs 182 and 184 of bonding clip 180 will engage the bonding shield on the stripped end portion C3 of cable C1 and the bonding shield on the stripped end CA of cable C2. A bonding rod 190, best illustrated in FIGS. 21 and 22, extends into passage 170 in each clip 160 for completing an electrical circuit from the bonding shield of cable C1 to the bonding shield of cable C2.

It should be appreciated that strain relief clip 60 and bonding relief clip 180 may be used in a housing for forming a butt-splice, if it is deemed expedient to do so. A first cable C1 would be positioned between inwardly deflected lower jaw portions 162b and 164b while a second cable C2 would be positioned between inwardly deflected upper jaw portions 162a and 162b. Legs 182 and 184 of a single bonding clip 180 would engage both the upper and lower bonding shields C3 of cables C1 and C2 for forming a conductive path therebetween. From the foregoing it should be readily apparent that strain relief clip 160 and bonding clip 180 are of unitary construction and are preferably constructed of electrically conductive material. The outer insulative layer of cables C1 and C2 is removed for exposing the bonding shields C3 of the respective cables C1 and C2. Clip 160 engages the insulation for stabilizing cables C1 and C2 while the bonding clips 180 serve the dual function of assuring that a ground is completed between cables C1 and C2 and also aids in the stabilizing of ends of cables C1 and C2 to minimize the possibility that cables C1 and C2 can be pulled out of housing 10 and to minimize the possibility that cables C1 and C2 may move sufficiently to permit entry of moisture through the encapsulating material deposited in at least one of the shell segments 20 or 40.

After housing segments 20 and 44 have been locked together as illustrated in FIGS. 2 and 3 of the drawing, enclosure 10 can be dropped in a trench and buried.

What is claimed is:

1. An enclosure for a splice between first and second cables, each having a layer of insulation and a bonding shield, including a housing formed of first and second housing segments having an entrance; sealant in at least one of said housing segments; and cable gripping apparatus in said housing, said gripping apparatus comprising:

a strain relief clip in one of said housing segments;

a projection in the other of said housing segments for urging said first cable into engagement with said strain relief clip to grip the layer of insulation for limiting movement of said first cable relative to the housing to prevent separation of said sealant from said first cable when said first cable is positioned to extend through said entrance into said housing; and a bonding clip of connecting bonding shields on said first and second cables.

2. An enclosure for a splice between first and second cables according to claim 1, said cable gripping apparatus comprising: a member having an opening bounded by edges which engage and grip the layer of insulation on said first cable.

3. An enclosure for a splice between first and second cables according to claim 1, said strain relief clip comprising: a thin substantially flat generally H-shaped member formed by legs separated by a slot, said legs being joined at lower ends by a connector portion.

4. An enclosure for a splice between first and second cables according to claim 1, said first housing segment having a latch to prevent movement of said first housing segment relative to said first cable.

5. An enclosure for a splice between first and second cables according to claim 1, said bonding clip having spaced legs; and a strap securing said strain relief clip to said bonding clip such that said strain relief clip and said bonding clip engage said first cable at spaced locations, said strain relief clip engaging the layer of insulation on said first cable and said bonding clip engaging the bonding shield on said first cable.

6. A bonding clip, for use in a wire splice enclosure to encapsulate splices between wires in first and second cables having an outer insulating jacket, a bonding shield and said wires, said clip comprising:

a strain relief portion having spaced legs;

a bonding portion having spaced legs;

a strap portion securing said strain relief portion to said bonding portion such that said strain relief portion and said bonding portion engage the first cable at spaced locations, said strain relief portion engaging the insulating jacket on the first cable and the bonding portion engaging the bonding shield on the first cable; and means for connecting said bonding portion to the bonding shield on the second cable.

7. A bonding clip according to claim 6, said spaced legs on said strain relief portion having upper and lower jaws, said upper jaws being isolated from said lower jaws such that said upper and lower jaws act independently of each other.

8. A bonding clip according to claim 6, said spaced legs on said bonding portion forming a generally V-shaped member; and a latching mechanism for securing ends of said spaced legs together for gripping the bonding shield of the second cable therebetween.

9. A bonding clip according to claim 6, said strain relief portion having a slot and wherein said means for connecting said bonding portion to the bonding shield on the second cable comprises a bonding rod having a first end urged into said slot in said strain relief portion and a second end urged into a slot in a strain relief portion of a second bonding clip.

10. An enclosure for a splice between first and second cables, each having a layer of insulation and a bonding shield, comprising:

a housing formed of housing segments having at least two entrances;

sealant in at least one of said housing segments;

a plurality of strain relief clips in one of said housing segments, one of said strain relief clips being positioned adjacent each of said entrances;

a plurality of projections in the other of said housing segments for urging the first cable into engagement with a first of said strain relief clips and for urging the second cable into engagement with a second of said strain relief clips to grip the layers of insulation on the first and second cables for limiting movement of the first and second cables relative to the housing to prevent separation of said sealant from the first and second cables;

a plurality of bonding clips, each bonding clip being connectable to the bonding shield on one of said cables; and an electrically conductive member for completing an electrical circuit from a first of the bonding clips to a second of the bonding clips for electrically connecting said bonding shields on said first and second cables.

11. An enclosure for a splice between first and second cables according to claim 10, each of said strain relief clips and each of said bonding clips being of unitary construction comprising:

a strain relief portion having spaced legs;

a bonding portion having spaced legs; and a connector strap portion securing said strain relief portion to said bonding portion.

12. An enclosure according to claim 11, said strain relief portion having a slot and wherein said electrically conductive member for completing an electrical circuit from a first of the bonding clips to a second of the bonding clips comprises: a bonding rod having a first end urged into said slot in the strain relief portion of a first bonding clip portion and a second end urged into the slot in a strain relief portion of a second bonding clip portion.

13. An enclosure for a splice between first and second cables according to claim 11, each of said spaced legs on each of said strain relief portions having upper and lower jaws, said upper jaws being isolated from said lower jaws by slots such that said upper and lower jaws act independently of each other.

14. An enclosure for a splice between first and second cables according to claim 11, said spaced legs on said bonding portion forming a generally V-shaped member; and latching means on said spaced legs for securing ends of said spaced legs together for gripping the bonding shield of one of said cables therebetween.

15. An enclosure for a splice between first and second cables according to claim 10, each of said strain relief clips comprising: a member having an opening bounded by edges that engage and grip the layer of insulation on one of the cables urged into engagement with the strain relief clip.

16. An enclosure for a splice between first and second cables according to claim 10, each of said strain relief clips comprising: a thin substantially flat member formed by legs separated by a slot, said legs being joined at lower ends by a connector portion.

17. An enclosure for a splice between first and second cables according to claim 10, each of said bonding clips having spaced legs; and a connector strap securing one of said strain relief clips to one of said bonding clips such that said strain relief clip and said bonding clip engage one of said cables at spaced locations, said strain relief clip engaging the layer of insulation and said bonding clip engaging the bonding shield.

18. An enclosure for a butt-splice between first and second cables, each having a layer of insulation and a bonding shield, comprising:

a housing formed of first and second housing segments having an entrance;

sealant in at least one of said housing segments;

a strain relief clip in one of said housing segments;

a projection in the other of said housing segments for urging the first and second cables into engagement with said strain relief clip to grip the layers of insulation for limiting movement of each of the first and second cables relative to the housing to prevent separation of said sealant from each of the first and second cables positioned to extend through said entrance into said housing; and a bonding clip in one of said housing segments for connecting said bonding shields on said first and second cables.

19. An enclosure for a butt-splice between first and second cables according to claim 18, said strain relief clip and said bonding clip being of unitary construction comprising:

a strain relief portion having spaced legs;

a bonding portion having spaced legs;

a connector portion joining said strain relief portion to said bonding portion such that said strain relief portion and said bonding portion engage each of the cables at spaced locations, said strain relief portion engaging the layer of insulation on each of the first and second cables and the bonding portion engaging the bonding shield on each of the first and second cables.

20. An enclosure for a butt-splice between first and second cables according to claim 18, said bonding clip having spaced legs and a latching mechanism for securing ends of said spaced legs together for gripping the bonding shields between the spaced legs.

21. An enclosure for a butt-splice between first and second cables according to claim 18, said a strain relief clip having spaced legs and upper and lower jaws on said spaced legs, said upper jaws being isolated from said lower jaws by a slot such that said upper and lower jaws act independently of each other when gripping the layers of insulation on the first and second cables.

22. An enclosure for a butt-splice between first and second cables according to claim 18, said a strain relief dip comprising: a thin substantially flat member having leg portions separated by a slot and joined at lower ends by a connector portion, each of said leg portions having an upper inwardly deformed portion and a lower inwardly deformed portion extending along one side of said slot.

* * * * *

UNITED STATES PATENT AND TRADEMARK OFFICE
CERTIFICATE OF CORRECTION

PATENT NO.    : 5,679,927

DATED         : October 21, 1997

INVENTOR(S)   : Antoon M. Hurkmans, Suresh Venkat & Selim Messelhi

It is certified that error appears in the above-identified patent and that said Letters Patent is hereby corrected as shown below:

Column 3, line 56, change "dose" to read --close--.

Column 3, line 63, change "pin" to read --in--.

Column 7, line 52, change "CA" to read --C4--.

Column 7, line 62, after 162b, insert --of clip 160--.

Signed and Sealed this

Twenty-seventh Day of January, 1998

Attest:

BRUCE LEHMAN

*Attesting Officer*    *Commissioner of Patents and Trademarks*